United States Patent [19]

Magnan et al.

[11] Patent Number: 4,726,412

[45] Date of Patent: Feb. 23, 1988

[54] PRODUCTION OF HIGH MELTING POINT METALLIC MOLDS

[75] Inventors: Elie Magnan, Poitiers; Robert Guillermond, Craponne, both of France

[73] Assignee: Rhone-Poulenc Specialites Chimiques, Courbevoie, France

[21] Appl. No.: 795,881

[22] Filed: Nov. 7, 1985

[30] Foreign Application Priority Data

Nov. 7, 1984 [FR] France .................................. 84 16929

[51] Int. Cl.⁴ .......................... B22C 7/00; B22D 23/00
[52] U.S. Cl. .......................................... 164/19; 164/45; 164/46; 164/235; 164/249; 29/DIG. 39
[58] Field of Search ........................ 164/19, 20, 45, 46, 164/235, 249; 29/DIG. 39; 219/121 PL

[56] References Cited

U.S. PATENT DOCUMENTS 2,479,598  8/1949  Barber et al. ........................... 164/19
3,638,299  2/1972  Garner et al. .......................... 164/19
3,784,152  1/1974  Garner et al. .......................... 164/19
4,535,831  8/1985  Sato et al. ............................. 164/45

FOREIGN PATENT DOCUMENTS 30340  3/1980  Japan ..................................... 164/45
215240  12/1983  Japan ..................................... 164/45
1304990  1/1973  United Kingdom .................. 164/19

Primary Examiner—Nicholas P. Godici
Assistant Examiner—Samuel M. Heinrich
Attorney, Agent, or Firm—Burns, Doane, Swecker & Mathis

[57] ABSTRACT

High melting point metallic, e.g., steel mold members are facilely and inexpensively produced by depositing, e.g., flame-spraying, droplets of a melt of a metal having a high melting point onto the front face surface of an elastomeric silicone mold pattern, said elastomeric silicone containing from 20 to 90% by weight of finely divided particulates of at least one refractory filler, and thereafter permitting said melt to solidify.

25 Claims, 10 Drawing Figures

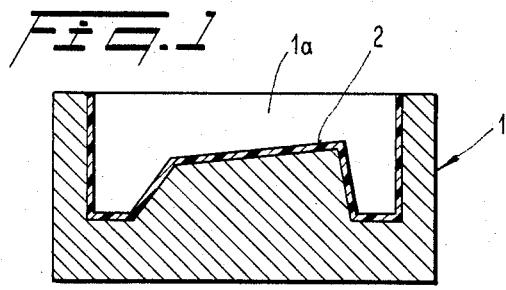
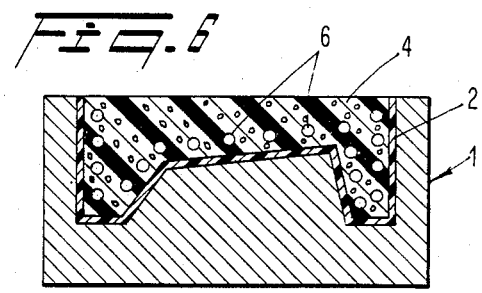
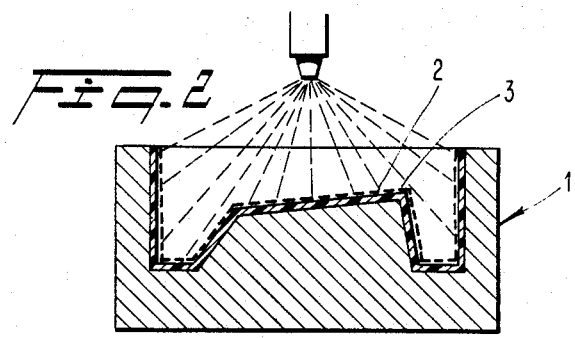
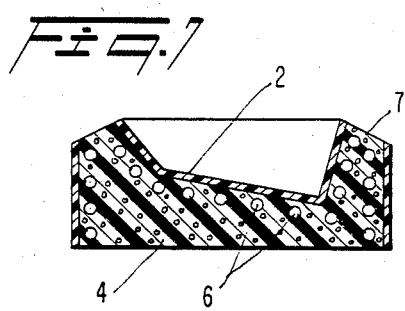
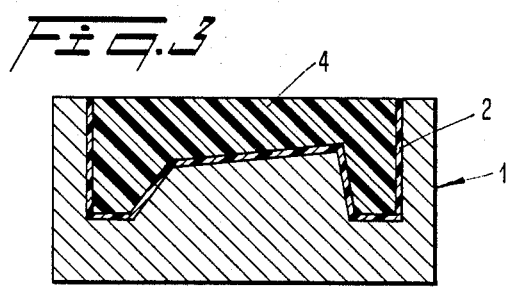
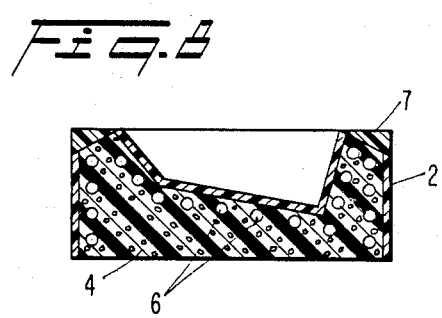
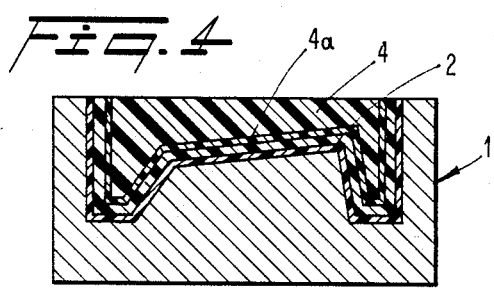
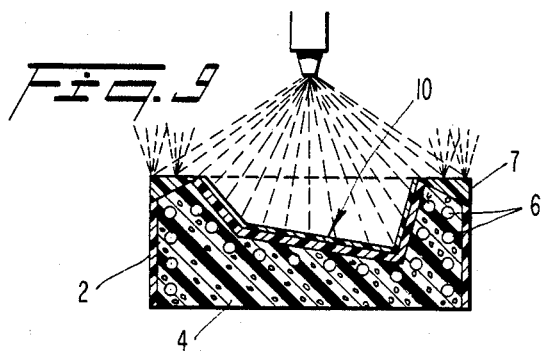
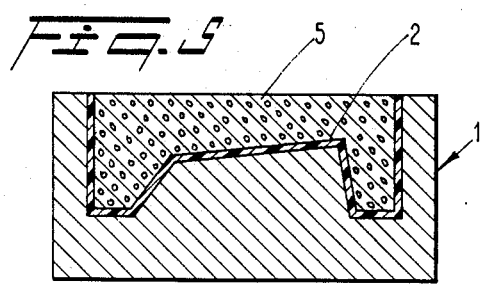
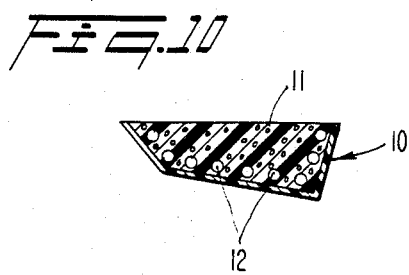

PRODUCTION OF HIGH MELTING POINT METALLIC MOLDS

BACKGROUND OF THE INVENTION

1. Field of the Invention:

The present invention relates to the manufacture of molds made of a metal having a high melting point, more especially by spraying molten metal onto a pattern made of filled silicone elastomer.

In the description which follows, the "master model" denotes the original model, the word "pattern" denotes a replica or reproduction of the model and the "mold" or "shell" denotes the mold or a part of the mold produced from a pattern.

2. Description of the Prior Art:

The manufacture of metal molds used for the mass production of plastic articles using conventional techniques such as gravity casting, compression molding, injection molding, thermoforming, and the like, is very time consuming and costly (usually several thousands of dollars per article) as a result of the manufacture thereof by mechanical means which require many hours of machining.

The molds produced by traditional machining methods can be made of steel and can conform to highly accurate dimensions, with tolerances on the order of a few μm and below. However, for many manufacturers and industrial sectors, in particular for the footwear and fancy goods industry, some sectors of the automobile industry, and the like, the dimensional tolerances are less strict and the number of different molds to be manufactured is very high.

Serious need thus exists for a process for the manufacture of molds made of a metal having a high melting point, for example, steel, which process can be used easily and quickly, without requiring costly machine tools and which enables such molds to be produced at a much lower cost than by the traditional methods.

As a result of their intrinsic physico/chemical properties, in particular because of their good thermal behavior, silicones have to date been employed in mold manufacturing processes as a constituent material of the pattern, or of the mold, with the intention of reducing the prime cost of the said molds.

Thus, in French Pat. No. 2,098,629 a silicone mold is described, permitting the molding of metals and nonferrous alloys melting at a temperature below 700° C. and capable of being used at least 100 times. These molds make it possible, therefore, to only produce molded articles made of a metal having a low melting point.

In U.S. Pat. Nos. 3,638,299 and 3,784,152, which are similar in nature, a mold is produced by spraying a metal onto a pattern. The pattern may be made of very diverse materials and in column 1, line 49, of said U.S. Pat. No. 3,784,152 it is indicated in passing that the pattern may be made of silicone rubber, without further detail, and in column 1, line 65 to column 2, line 14, it is further indicated that the metal to be sprayed may be any metal. It is clearly specified, however, that the preferred metal is zinc or aluminum, the melting points of which are relatively low.

In published Japanese Patent Application, Kokai No. 54/27,394, a process is described for the manufacture of a metal mold by producing a master model made of aluminum sheet, onto which is produced a pattern made of an RTV silicone elastomer. Then, from this pattern, a metal mold is produced by spraying a metal which, according to the sole example of this application, is also zinc.

These methods of mold manufacture are of interest because they make it possible to produce, very rapidly and at a low cost, metal molds which can be employed to produce articles made of thermosetting, thermoplastic and elastomeric materials by various known molding and forming techniques.

However, since such molds are made of a metal having a low melting point, such as aluminum, zinc, tin, or their alloys, even after they have been reinforced, they do not have adequate mechanical characteristics to be repeatedly subjected to the stresses and the forces inherent in molding and forming techniques.

Good mechanical characteristics could be produced by selecting a metal or alloy other than aluminum, zinc or tin. However, other metals or alloys, such as steel, which have good mechanical characteristics, also have a high melting point, generally above 1200° C., principally above 1400° C. in the case of stainless steels. Now, spraying molten steel onto silicone patterns, according to the processes of the prior art, is not feasible because the molten steel droplets rebound on the pattern which, furthermore, suffers damage and is very severely distorted as a result of the very high temperature of the said droplets.

SUMMARY OF THE INVENTION

Accordingly, a major object of the present invention is the provision of an improved process for the production of metal molds from characteristic silicone patterns. Said patterns are suitable for the fast, easy and inexpensive manufacture of molds made of a metal having a high melting point, by spraying molten metal thereon.

In the description which follows, all percentages and parts are given by weight, unless specified otherwise.

Briefly, the present invention features a process for the manufacture of a metal mold by spraying molten metal onto a pattern made of silicone elastomer, characterized in that the silicone elastomer contains from 20 to 90%, preferably from 40 to 70% by weight, of fine particles of at least one refractory filler, and in that the said metal is a metal having a high melting point.

BRIEF DESCRIPTION OF THE DRAWINGS

FIGS. 1 to 8 illustrate the several stages utilized in the production of a pattern member according to the invention; and FIGS. 9 and 10 illustrate the manufacture of a half-shell metal mold according to the invention.

DETAILED DESCRIPTION OF THE INVENTION

More particularly according to the present invention, by the term "silicone elastomer" there is intended any silicone elastomer produced by the setting or curing, at an elevated or ambient temperature, of an organopolysiloxane composition deposited prior to setting onto a master model fabricated from such traditional materials as wood, plastic, plaster, wax, modelling dough, and the like.

In order to match the surface of the master model more closely, the organopolysiloxane composition may be, before it is cross-linked into a silicone elastomer, preferably in the form of a flowing material coating the surface of the master mixture.

Thixotropic organopolysiloxane compositions can, however, be employed insofar as they adapt themselves well to the surface of the master mixture.

In fact, any organopolysiloxane composition supplied in one or more packages (single- or multi-component), cross-linking under cold or hot conditions, with or without a catalyst, into a silicone elastomer can be employed insofar as the composition permits a filler content of from 20 to 90% and can be uniformly deposited onto the surface of the master model and can faithfully reproduce the shape of the said surface. These compositions are amply described in the literature and particularly in the text by Walter Noll: *Chemistry and Technology of Silicones*, Academic Press, 2nd edition, pages 386 to 409 (1968).

These organopolysiloxane compositions contain a base organopolysiloxane polymer which ranges from fluids (at least 7 siloxane moieties per molecule) to nonflowing gums. As mentioned earlier, any cross-linking system may be employed for the siloxane.

For hot vulcanization systems (HVE, hot vulcanizing elastomers) the vulcanizing agents employed are organic peroxides containing at least one aromatic aryl radical per molecule.

Such HVE's are described, for example, in U.S. Pat. Nos. 3,142,655, 3,821,140, 3,836,489 and 3,839,266.

With this group of HVE elastomers, a subgroup can more particularly be employed for carrying out the process of the invention. These are pumpable elastomers (PSE) described, in particular, in U.S. Pat. Nos. 3,791,998 and 4,173,560 and British Pat. Nos. 2,091,281 and 2,091,282.

In the case of systems which cross-link at ambient temperature (CVE, cold vulcanizing elastomers, or RTV), it is possible to employ a wide variety of single-component or two-component compositions which cross-link by polyaddition or polycondensation reactions in the presence of a metal catalyst and, as appropriate, an amine and a cross-linking agent which is typically a silane bearing hydrolyzable groups.

Exemplary of a single-component or two component CVE which cross-links by polyaddition reactions (principally by reaction of the ≡SiH groups borne by a silane or a polyorganosiloxane, with hydrocarbon groups containing ethylenic unsaturation and which are bonded to a silicon atom of a siloxane, generally in the presence of a platinum catalyst), representative are the compositions described in U.S. Pat. Nos. 3,220,972, 3,284,406, 3,436,366, 3,697,473 and 4,340,709.

Exemplary of a two-component CVE cross-linking by polycondensation reactions (usually containing an alpha,omega-dihydroxypolyorganosiloxane oil and a cross-linking agent which is a silane bearing at least three hydrolyzable groups or a polysiloxane obtained by partial hydrolysis of this silane, in the presence of a metal catalyst and/or an amine), representative are the compositions described in U.S. Pat. Nos. 3,678,002, 3,888,815, 3,933,729 and 4,064,096 and British Pat. No. 2,032,936.

Among such elastomeric compositions, preferred are those for which the cross-linking agent is a silicate, an alkyltrialkoxysilane or a polysilicate and for which the metal catalyst is a tin salt and, in particular, the compositions incorporating:

(1) at least one alpha,omega-dihydroxydiorganopolysiloxane polymer having a viscosity of from 500 to 1,000,000 mPa.s at 25° C., in which the organic radicals are monovalent hydrocarbon radicals;

(2) 20 to 90% by weight of at least one refractory filler;

(3) at least one cross-linking agent selected from:

(i) the polyalkoxysilanes of the formula:

$$(R_1O)_aSi(R_2)_{4-a} \qquad (Ia)$$

in which a is 3 or 4, $R_1$ and $R_2$, which are identical or different, are monovalent hydrocarbon radicals containing up to 8 carbon atoms, and $R_1$ can additionally denote a radical $R_3OR_1$ in which $R_3$ is a divalent hydrocarbon radical containing up to 6 carbon atoms and $R_1$ has the above meaning;

(ii) the polyalkoxysiloxanes containing at least two alkoxy radicals bonded to a silicon atom per molecule, in which the silicon atoms are bonded via Si—O—Si bonds, the other valencies of the silicon atoms being satisfied by the radicals $R_1O$ or $R_2$, with $R_1$ and $R_2$ having the meaning given above;

(4) a catalytically effective amount of at least one catalytic tin compound.

Typically, per 100 parts of (1), a sufficient number of parts of (2) are used to result in a quantity representing 20 to 90% by weight of the total, 0.5 to 15 parts of (3) and of 0.005 to 1 part, preferably of 0.01 to 0.5 part, of (4), calculated by weight of tin metal.

The alpha,omega-dihydroxydiorganopolysiloxane polymers (1) employed in the compositions of the invention have a viscosity of 500 to 1,000,000 mPa.s at 25° C., preferably 800 to 500,000 mPa.s at 25° C.; they principally consist of diorganosiloxyl moieties, but the presence of other moieties such as monoorganosiloxyl in a proportion of at most 2 numerical % is not excluded.

Exemplary of organic radicals which are bonded to the silicon atoms of these polymers, representative are those of the following types:

(i) alkyl containing from 1 to 4 carbon atoms, such as methyl, ethyl or propyl radicals;

(ii) haloalkyl containing from 3 to 4 carbon atoms, such as 3,3,3-trifluoropropyl or 4,4,4-trifluorobutyl radicals;

(iii) aryl containing from 6 to 8 carbon atoms, such as phenyl, tolyl or xylyl radicals;

(iv) haloaryl containing from 6 to 7 carbon atoms, such as chlorophenyl, dichlorophenyl, trichlorophenyl, tetrachlorophenyl and trifluoromethylphenyl radicals;

(v) cyanoalkyl containing from 3 to 4 carbon atoms, such as beta-cyanoethyl or gamma-cyanopropyl radicals.

Methyl radicals represent at least 60%, preferably 75%, of the total amount of such organic radicals.

Various methods are known to the art for the preparation of these polymers (1), but generally those which have been established industrially are used, for example the polymerization of diorganocyclopolysiloxanes with the aid of a catalytic amount of an alkaline or acidic agent, followed by treatment of the polymerizates with calculated amounts of water (French Pat. Nos. 1,134,005 and 1,198,749); they are commercially available, moreover, from silicone producers.

The cross-linking agents (3) employed, as mentioned earlier, in a proportion of at most 15 parts, preferably at most 7 parts, per 100 parts of polymer (1) are used principally to cross-link the composition.

The cross-linking agents (3) are well known materials, described particularly in French Pat. Nos. 1,330,625, 2,121,289, 2,121,631 and 3,458,572.

As the monovalent hydrocarbon radical constituting $R_1$ and $R_2$, preferred are alkyl, alkenyl, alkoxyalkyl, phenyl, alkylphenyl and phenylalkyl radicals, optionally substituted by a halogen atom.

As the silanes, representative are those of the formula:

$$CH_3Si(OCH_3)_3$$

$$CH_3Si(OCH_2CH_3)_3$$

$$CH_3Si(OCH_2CH_2OCH_3)_3$$

$$Si(OCH_2CH_2OCH_3)_4$$

$$Si(OCH_3)_4$$

$$Si(OCH_2CH_3)_4$$

$$CH_2=CHSi(OCH_2CH_2OCH_3)_3$$

$$C_6H_5Si(OCH_3)_3$$

$$C_6H_5Si(OCH_2CH_2OCH_3)_3$$

$$CH_3Si(OCH_2-\underset{CH_3}{CHOCH_3})_3$$

Among the cross-linking agents (3), those more particularly preferred are alkyltrialkoxysilanes, alkyl silicates and alkyl polysilicates in which the organic radicals are alkyl radicals containing from 1 to 4 carbon atoms.

Exemplary alkyl silicates are methyl silicate, ethyl silicate, isopropyl silicate, n-propyl silicate and the polysilicates selected from the products of a partial hydrolysis of these silicates; these are polymers consisting of a high proportion of moieties of the formula $(R^4O)_2SiO$ and a small proportion of moieties of the formula $(R^4O)_3SiO_{0.5}$, $R^4OSiO_{1.5}$ and $SiO_2$; the symbol $R^4$ denoting the methyl, ethyl, isopropyl or n-propyl radicals. Their characterization is usually based on their silica content which is established by determining the product of total hydrolysis of a sample.

Methods for their preparation are also well known to this art and appear, in particular, in the text *Chemistry and Technology of Silicones* by W. Noll, pages 648 to 659. In order to be compatible and/or reactive with the other ingredients used for the preparation of the compositions of the invention, these polymers must be capable of dissolving in the usual hydrocarbon solvents, such as toluene, xylene or methylcyclohexane, in a proportion of at least 50 parts of polymers per 100 parts of solvents.

As a polysilicate, it is preferred to use a partially hydrolyzed ethyl silicate marketed under the trademark "Ethyl Silicate-40" by Union Carbide Corporation, or a partially hydrolyzed propyl silicate.

Compound (4) is a catalytic compound containing tin, for catalyzing this type of composition, and which may be, in particular, a tin salt of a mono- or dicarboxylic acid. These tin carboxylates are described particularly in the Noll text, *Chemistry and Technology of Silicones*, page 337, Academic Press, 2nd Edition (1968). Especially representative are dibutyltin naphthenate, octanoate, oleate, butyrate and dilaurate, and dibutyltin diacetate.

It is also envisaged to use salts of monocarboxylic acids branched on an aliphatic carbon atom in an alpha position relative to the carboxy group and containing at least 8 carbon atoms per molecule, such as those described in French Pat. No. 2,066,159, in particular dibutyltin diversatate.

It too is possible to use as a catalytic compound containing tin, the reaction product of a tin salt, in particular a tin dicarboxylate with ethyl polysilicate, as described in U.S. Pat. No. 3,186,963. It is also possible to use the reaction product of a dialkyl dialkoxysilane with a tin carboxylate as described in U.S. Pat. No. 3,862,919.

It is likewise envisaged to use the reaction product of an alkyl silicate or an alkyltrialkoxysilane with dibutyltin diacetate, as described in Belgian Pat. No. 842,305.

As a single-component CVE cross-linking by polycondensation reactions with atmospheric borne moisture, optionally in the presence of a metal catalyst (Ti, Sn), this CVE generally contains an alpha,omega-dihydroxypolyorganosiloxane oil or a polyorganosiloxane oil blocked at each end by at least two hydrolyzable organic groups such as alkoxy or acyloxy groups and a silane bearing at least three hydrolyzable organic groups; the use of this silane is not essential if a blocked oil is used.

According to the nature of these groups, the single-component CVE's are referred to as acidic, neutral or basic.

Exemplary of the acidic CVE's, representative are, for example, the compositions described in U.S. Pat. Nos. 3,035,016, 3,077,465, 3,133,891, 3,409,573, 3,438,930, 3,647,917 and 3,886,118.

Exemplary of the neutral CVE's, representative are, for example, the compositions described in U.S. Pat. Nos. 3,065,194, 3,542,901, 3,689,454, 3,779,986 and 4,417,042, British Pat. No. 2,052,540 and European Pat. No. 69,256.

Exemplary of the basic CVE's, representative are, for example, the compositions described in U.S. Pat. Nos. 3,378,520, 3,364,160, 3,417,047, 3,464,951, 3,742,004 and 3,758,441.

In a preferred embodiment of the invention, the single-component free-flowing compositions are used, such as those described in U.S. Pat. Nos. 3,922,246, 3,965,280 and 4,143,088, and the self-accelerated flowing compositions described in published European Patent Applications Nos. 118,325 and 117,772.

By "fine particles of a refractory filler" are intended particles of a mean size generally below 300 μm, and known to impart good heat resistance and mechanical strength to the materials into which they are introduced. As refractory particles which can more particularly be employed for carrying out the process of the invention, exemplary are, in particular, ferric oxide, corundum-type crystallized alumina, barium sulfate, lithopone, which is a mixture of zinc sulfide and barium sulfate, talc, calcined talc, rare-earth oxides, in particular cerium and lanthanum oxides, alumina hydrate and diatomaceous earths of the cellite type, pyrogenic silicas, alkali metal silicozirconates such as sodium silicozirconate, pyrogenic silicas treated with a silane such as cyclooctamethyltetrasiloxane, hexamethyldisilazane and chlorosilanes, zirconia, and chromium and titanium oxides. These refractory fillers are introduced, singly or as their various possible mixtures, into the elastomeric composition, before use, by any suitable means, for example, by double-roll mills, kneaders and pug mills.

In another preferred embodiment of the invention, up to approximately 30%, preferably up to approximately 20%, of refractory fillers may be replaced by a heat-conductive material selected from metal powder or by metal or metallized mineral fibers, in order to improve the outward heat transfer from the silicone pattern.

Suitable metals or alloys are particularly aluminum, iron, steel, zirconium, titanium, bronze, copper and brass. The particles of which the powders consist should be high melting, and have a melting point above approximately 700° C. Their particle size distribution is similar to that of the refractory fillers. The dimensions of the heat-conductive fibers are similar to those of the refractory fibers described below.

In yet another embodiment of the invention, up to 30% of the refractory fillers may be replaced by fibers of refractory materials a few tens of μm in diameter and a few mm in length. These fibers also imorove the mechanical and heat properties of the pattern.

Carbon fibers, asbestos fibers and glass fibers which have been treated and which, in particular, have been freed from enzymes, may particularly be employed as such fibers.

In still another embodiment of the invention, a portion of the refractory fillers up to 20%, and preferably up to 10% of the fillers, may be incorporated into the silicone elastomer by spraying, preferably in the molten state, utilizing the aid of a powder gun for ceramics at a high temperature, or utilizing the aid of a plasma gun.

This introduction is preferably carried out before complete cross-linking of the silicone elastomer and at the time when such elastomer remains on the master model; the spraying is then carried out on the rear face surface of the pattern, opposite the front face surface which is to receive the molten metal. However, when the silicone pattern is sufficiently rigid, this spraying may be carried out after its separation from the master model on the front face surface.

Commercial elastomeric compositions may already contain a portion of the required refractory filler content. In order to enable them to be used in the process of the invention it suffices to. complete the required amount using the methods indicated above.

The organopolysiloxane composition may be deposited onto the surface of the master model as a layer a few mm in thickness, for example, from 2 to 20 mm in thickness. After cross-linking, the pattern may be detached from the master model. The front face surface of the pattern which was in contact with the master model is the face surface which subsequently will receive the sprayed molten metal.

In still another embodiment of the invention, the rear face surface of the silicone pattern may be reinforced by casting thereon an ordinary silicone elastomer, a metal or a low-melting metal alloy, or a thermosetting plastic such as a polyester, phenolic or epoxy resin; channels in which a cooling fluid circulates (water, air, nitrogen, liquid and the like) may comprise the reinforcing material.

Such cooling channels are particularly useful when it is intended to produce several molds in succession, utilizing the same pattern.

The front face surface of the pattern which is to receive the molten metal is preferably slightly roughened, for example, by sand-blasting with a compressed air gun.

The silicone pattern preferably has a Shore A hardness ranging from 50 to 90.

In a preferred embodiment of the invention, the central part of the pattern corresponding to the shell to be produced has a Shore hardness of at least 50, while the upper peripheral part of the pattern has a Shore hardness below 30. In this manner, the projected metal particles cling only to the central part of the pattern, rebounding on the upper peripheral part, which makes it possible to avoid a shell deflashing operation.

The thickness of the projected metal can be very low (a few micrometers) or may attain a value of several centimeters. It is also possible to produce large-sized articles, with a surface area, for example, exceeding one square meter. In addition to the use of these shells as a mold, they can also be used to produce punches and cavities fitted to presses for stamping metal plates, for example, for stamping metal sheets for the manufacture of body parts, particularly of motor vehicle body parts, and also of electrodes for spark erosion.

These punches and cavities are produced by reinforcing the shells, namely, by filling the distal region of the shells by spraying or casting low-melting or high-melting molten metals or by known composite or laminate materials such as glass, carbon or boron fibers embedded in a thermosetting resin, such as a phenolic or epoxy resin.

And in yet another embodiment of the process of the invention, a fine film of metal (of a thickness which advantageously ranges from a few μm to a few tenths of a mm) is produced on the front face surface of the pattern, preferably roughened. This fine metal film makes it possible to have an upper face surface which is perfectly smooth and consequently to improve the surface quality of the shell. In addition, this layer improves the adhesion of the molten metal having a high melting point. This deposition may be produced by various means. A first means consists in producing an electrolytic deposit on the pattern by means of the customary baths, for example, by means of nickel-plating, copper-plating and silver-plating baths. Another means consists of spraying onto the front face surface of the pattern, preferably sand-blasted beforehand, a thin film (of a thickness ranging from a few μm up to a few tenths of a mm, generally from 5 μm to 5/10 mm) of at least one low-melting molten metal selected from among bismuth, lead, tin, zinc, aluminum, or alloys thereof.

The 85/15 Zn/Al alloy (85% by weight of zinc and 15% by weight of aluminum) is more particularly preferred. This thin film subsequently facilitates a possible electrolytic chromium plating of the shell.

By "high-melting metal" to be sprayed onto the pattern is intended metals or alloys whose melting point is generally above 1000° C., in most cases above 1200° C., such as common steels, stainless steels melting at approximately 1400° C., and specialty steels containing titanium, vanadium, and the like.

In the accompanying Figures of Drawing:

FIGS. 1 to 8 illustrate the various stages in the manufacture of a pattern according to the invention; and FIGS. 9 to 10 illustrate the manufacture of a half-shell of a metal mold according to the process of the invention.

Into a master model 1, which may be made of wood, plastic, plaster, wax, modelling dough, or the like, and the central part 1a of which has the shape or profile of the mold to be manufactured, an elastomeric silicone composition of a suitable type is cast at ambient temperature in the form of a layer 2, 1 to 2 millimeters in thickness (FIG. 1), covering the front or exposed face surface of the master model before complete setting of the layer 2, and a refractory powder such as those comprising the composition of the silicone elastomer is sprayed for a few seconds (for example, 10 seconds) with the aid of a Jet P.M.R. ® gun, marketed by the French company SNMI Societe Nouvelle de Metallisation Industries, or with the aid of a Metco N ® gun for ceramics at a high temperature. A fraction of the sprayed particles penetrates into the layer 2 while the remainder of the particles forms a thin layer 3 a few tens of micrometers in thickness (FIG. 2). This brief spraying, which is not essential, has the advantage of removing bubbles from the layer 2 and accelerating the vulcanization of this layer and further improving the heat behavior of the pattern. The gun should not be placed too close to the layer 2 during the spraying. A distance on the order of 60 cm has been found to be suitable, together with a spraying angle of from 90° to 45°. After the above-mentioned spraying, the residual cavity is filled with a suitable filling material. Several alternatives are possible. A first, preferred embodiment consists of filling the cavity with a filled elastomeric silicone composition 4 of the same composition as that which was used to cast the layer 2 (FIG. 3). A second possibility differs from the first in that a layer 4a of reinforcing fibers or of a fibrous reinforcing powder is incorporated in the mass 4 (FIG. 4). A third possibility is to fill the residual cavity with plaster or with epoxy resin concrete or with another material capable of setting without shrinking (FIG. 5).

If desired, it is possible to arrange for cooling channels and ejector bores to be present in the mass of the pattern. For this, it suffices to place within the residual cavity of the pattern tubes 6 which extend on both sides of the said cavity, and to then cast the filling material. After setting or vulcanization of the latter, the tubes may be extracted or left in place, as required (FIG. 6). Cooling fluid lines can be connected to the channels thus produced. The fluid may be air, water, oil or the like. Water is usually suitable.

The vulcanized pattern is then separated from the master model (FIG. 7) and can be employed as such. However, it has been found advantageous to make the top edge of the pattern out of a silicone elastomer of a low Shore A hardness (below 30) in order that the projected metal particles rebound on this edge and do not adhere thereto, which avoids a mold deflashing operation. On the other hand, the high Shore A hardness of the filled silicone elastomer forming the remainder of the pattern promotes adhesion of the said particles. Thus, consequently, the upper part 7 of the pattern edge produced upon completion of the preceding stages is beveled as shown in FIG. 7, and then rebuilt with the aid of a silicone composition of low Shore A hardness. An unfilled or slightly filled silicone composition may be employed for this purpose, for example. The pattern illustrated in FIG. 8 is ultimately obtained.

Inside the pattern shown in FIG. 8 and on the surface of the silicone layer 2 a thin layer of a low-melting alloy (for example, 85/15 Zn/Al) may be sprayed with the aid of a spray gun.

Once produced, the silicone elastomer pattern according to the invention may be employed to produce molds by flame-spraying a high-melting metal or alloy with the aid of a conventional metallizing gun of the type of those employed for protecting ferrous metals against corrosion, for example, Metco 12 E ® or Top-Jet/2 ® and Z-Jet/2 ® guns, the latter two being marketed by SNMI. FIG. 9 illustrates the use of the flame-spraying method. This method is very simple and consists of spraying onto the mold molten droplets of a high-melting metal or alloy. The spraying time is a function of the thickness which is required for the metal article. The shell 10 is readily detached from the silicone elastomer pattern without damaging the latter and deflashing is generally unnecessary.

The shell 10 may be employed as such or it may be necessary to subject it to other additional stages of manufacture. When the shell itself is intended for use as a mold, for molding a plastic or as a stamping die, the rear portion of the shell 10 can be filled with a reinforcing material 11 which can be set (FIG. 10). This reinforcing material may be, for example, an epoxy resin concrete, a mixture of epoxy resin and of aluminum shot or an Al-Si alloy (94/6) cast by gravity in a molten state at approximately 720° C., or flame-sprayed. Channels 12 may be provided in the reinforcing filler material for circulating therein a heating or coolant liquid, for example, in the case of a mold for plastics.

In order to further illustrate the present invention and the advantages thereof, the following specific examples are given, it being understood that same are intended only as illustrative and in nowise limitative.

EXAMPLES 1 to 16

To produce the pattern, a two-component, tin-catalyzed CVE was used, consisting of:
 (a) for the first component A:
  (i) 100 parts of an alpha,omega-dihydroxypolydimethylsiloxane oil having a viscosity of 3500 mPa.s at 25° C.;
  (ii) 6 parts of propyl silicate;
  (iii) x parts of refractory fillers;
 (b) for the second component B:
  (i) 1 part of dibutyltin dilaurate;
  (ii) 7 parts of a polydimethylsiloxane oil blocked at each end of the polymer with a trimethylsiloxyl group.

To prepare the composition, the x parts of filler which were necessary to formulate the required total amount shown in Table I below were incorporated and, at the time of use, 5 parts of B were mixed with 100 parts of A.

Next, the operations were carried out as shown in FIG. 1 with deposition of a layer 2 between 2 and 3 mm in thickness, then as in FIG. 3 with filling of the rear face surface of the pattern with the same elastomer as that of the pattern 2, then as in FIG. 7 with measurement of the Shore A hardness of the front face surface of the pattern, then carrying out a roughening of this front face surface, followed or not, as appropriate, by the deposition of a thin layer (2/10 mm in thickness) of an 85/15 Zn/Al alloy and as in FIG. 9 with spraying of a stainless steel marketed in the form of wire by Metco under the trademark Met Coloy 2 ®, having the composition (% by weight):
 (i) nickel: 0.5
 (ii) manganese: 0.35
 (iii) silicon: 0.50
 (iv) phosphorus: 0.02
 (v) sulfur: 0.02
 (vi) chromium: 13.5
 (vii) iron: remainder
to produce a shell 10 (FIGS. 9 and 10) approximately 5 mm in thickness.

This series of operations was repeated, changing the nature and/or the percentage of the refractory fillers. The results are reported in Table I below. The result of spraying was assessed using the symbols:

+ good: There was good adhesion to the metal and no tearing of the silicone when the shell was detached.
− poor: Poor adhesion to metal and/or tearing of the silicone when the shell was detached.

The percentages of fillers shown are, of course, calculated in relation to the total weight of the organosiloxane composition including the fillers.

EXAMPLE 17

To prepare the silicone elastomer, a two-component CVE was used which cross-linked by polyaddition and was prepared at the time of use by mixing 10 parts of component A per 1 part of component B.

(a) component A (i) 37.5 parts of an alpha,omega-bis(dimethylvinylsiloxy)polydimethylsiloxane oil, having a viscosity of 100,000 mPa.s at 25° C.;

(ii) 45 parts of an alpha,omega-bis(dimethylvinylsiloxy)polydimethylsiloxane oil, having a viscosity of 3500 mPa.s at 25° C.;

(iii) 17.5 parts of resin MQ solids as a 50% solution in xylene, consisting substantially of the moieties $(CH_3)_3SiO_{\frac{1}{2}}$ (40%) and $SiO_{4/2}$ (53%) and modified by the moieties $(CH_3)(CH_2=CH)SiO$ (6%), and having a vinyl content, by weight relative to the weight of the dry resin, greater than 2.2%.

To this component A were added x parts of refractory fillers, such that the final composition resulting from mixing 10 parts of A and 1 part of B contained 19.0% of quartz and 39.4% of corundum, both finely ground, and 10 mg of platinum (per 1600 g of filled elastomer) in the form of a complex of chloroplatinic acid and isopropanol, as described in U.S. Pat. No. 3,220,972, mentioned hereinabove.

(b) component B (i) 50 parts of modified MQ resin solids as a 50% solution in xylene, identical to that employed in component A;

(ii) 15 parts of M'Q resin solids as a 50% solution in xylene, containing 1 mole of $SiO_{4/2}$ moiety per 2 moles of $(CH_3)_2HSiO_{\frac{1}{2}}$ moiety with a weight content of hydrogen bonded to a silicon atom of 0.9%;

(iii) 35 parts of an alpha,omega-bis(dimethylvinylsiloxy)polydimethylsiloxane oil having a viscosity of 3500 mPa.s at 25° C.

10 parts of A per 1 part of B were consequently mixed to prepare the elastomeric composition.

The same operations as in Example 1 were carried out with the deposition of a thin layer of an 85/15 Zn/Al alloy, 2/10 mm in thickness, the Shore A hardness of the front face surface of the pattern was 50 and the result of spraying was good.

EXAMPLE 18

The silicone elastomer was produced using a single-component, free-flowing CVE consisting of:

(i) 100 parts of an alpha,omega-dihydroxypolydimethylsiloxane oil having a viscosity of 3500 mPa.s at 25° C.;

(ii) 7 parts of an alpha,omega-dihydroxypolymethylphenylsiloxane oil having a viscosity of 350 mPa.s at 25° C.;

(iii) 3 parts of methyltriacetoxysilane and $2 \cdot 10^{-3}$ parts of butyl titanate.

To this composition were added x parts of fillers such that the composition contained 12.7% of celite, 10.7% of pyrogenic silica, 16.6% of corundum and 18.4% of titanium oxide.

The same operations as in Example 1 were carried out with deposition of a thin layer of an 85/15 Zn/Al alloy (1/10 mm in thickness), the Shore A hardness of the front face surface of the pattern was 50, and the result of spraying was good.

TABLE I

| | EXAMPLES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| CELITE | 12.4 | 12.4 | 8.7 | 14.8 | 20.9 | 10.4 | 9.8 | 8.2 | 8.6 | 12.6 | 14.4 | 13.1 | 12.2 | 8.4 | 12.2 | |
| PYROGENIC SILICA | | | | 6.1 | | | | | 2.0 | | | | | | | |
| FERRIC OXIDE | 27.3 | 27.3 | 19.8 | 32.7 | 32.7 | 22.9 | 21.5 | 18.0 | 20.0 | 27.8 | 31.6 | 28.8 | 26.8 | 18.4 | 26.8 | 28.9 |
| CORUNDUM | | | 45.2 | | | 34.2 | 36.2 | 48.2 | 40.0 | | | | | 47.1 | | |
| ZIRCONIUM OXIDE | | | | | | | | | | 20.0 | | | | | | |
| CALCINED TALC | | | | | | | | | | | 9.1 | | | | | |
| SODIUM SILICOZIRCONATE | | | | | | | | | | | | 17.4 | 25.1 | | | |
| BaSO4 | 28.5 | | | | | | | | | | | | | | | |
| LITHOPONE | | 21.5 | | | | | | | | | | | | | | |
| TiO2 | | | | | | | | | | | | | | | | 18.4 |
| TOTAL FILLERS (% by wt) | 68.2 | 61.2 | 73.7 | 53.6 | 53.6 | 67.5 | 67.5 | 74.4 | 70.6 | 60.4 | 55.1 | 59.3 | 64.1 | 73.9 | 39.0 | 47.3 |
| SHORE A HARDNESS | 61 | 60 | 71 | 61 | 70 | 71 | 74 | 79 | 55 | 60 | 64 | 55 | 60 | 70 | 61 | 60 |
| Zn/Al FILM | no | no | no | no | no | no | no | no | yes | yes | yes | yes | yes | yes | yes | yes |
| RESULT OF SPRAYING | + | + | + | + | + | + | + | + | + | + | + | + | + | + | + | + |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a metal mold member, comprising spraying a melt of a metal having a melting point of at least 1000° C. onto the front face surface of an elastomeric silicone mold pattern, said front face surface having a Shore A hardness ranging from 61 to 79, said elastomeric silicone containing from about 39 to about 74% by weight of finely divided particulates of at least one refractory filler, permitting said melt to solidify, and thereafter detaching said metal mold member from said mold pattern.

2. The process as defined by claim 1, comprising spraying a thin layer of said molten metal onto said elastomeric silicon mold pattern, said thin layer ranging in thickness from a few micrometers to several centimeters.

3. The process as defined by claim 1, wherein said front face surface of the elastomeric silicon mold pattern before said depositing is roughened.

4. The process as defined by claim 1, wherein said molten metal has a melting point of at least 1200° C.

5. The process as defined by claim 1, wherein said molten metal has a melting point of at least 1400° C.

6. The process as defined by claim 1, said finely divided refractory filler particulates having a mean particle size below 300 μm.

7. The process as defined by claim 6, said finely divided refractory filler particulates having a mean particle size ranging from 1 to 100 μm.

8. The process as defined by claim 1, said elastomeric silicone containing from 40 to 70% by weight of said finely divided refractory filler particulates.

9. The process as defined by claim 1, said finely divided refractory filler particulates comprising ferric oxide, crystallized alumina, alumina hydrate, diatomaceous earth, pyrogenic silica, zirconia, chromium oxide, titanium oxide, barium sulfate, lithopone, talc, rare earth oxide, a silicozirconate, or mixture thereof.

10. The process as defined by claim 1, said elastomeric silicone mold pattern having a thickness ranging from 2 to 20 mm.

11. The process as defined by claim 1, the front face surface of said elastomeric silicone mold pattern before said depositing being provided with a thin metallic film adopted to enhance the adhesion of said high melting molten metal thereto.

12. The process as defined by claim 11, said thin metallic film being provided by spraying.

13. The process as defined by claim 11, said thin metallic film having a thickness of from about 5 microns to about 5/10 millimeters.

14. The process as defined by claim 11, said thin metallic film comprising a metal having a low melting point.

15. The process as defined by claim 14, said low melting point metal comprising bismuth, lead, tin, zinc, aluminum, or alloy thereof.

16. The process as defined by claim 1, said high melting point metal comprising a steel, stainless steel or specialty steel.

17. The process as defined by claim 1, wherein up to 30% of said refractory filler particulates is replaced by a heat transfer material.

18. The process as defined by claim 17, said heat transfer material comprising metal powder, or metal, metallized or refractory fibers.

19. The process as defined by claim 1, wherein up to 20% of said refractory filler particulates have been sprayed into the back face surface of said elastomeric silicone mold pattern.

20. The process as defined by claim 1, further comprising reinforcing the rear face surface of said elastomeric silicone mold pattern.

21. A process for the production of a metal mold member, comprising co-extensively depositing a layer of a curable organopolysiloxane onto the surface to be reproduced of a master model, curing said organopolysiloxane into an elastomeric silicone mold pattern, spraying droplets of a melt of a metal having a melting point of at least 1,000° C. onto the front face surface of said elastomeric silicone mold pattern, said front face surface having a Shore A hardness ranging from 61 to 79, said elastomeric silicone containing from about 39 to about 74% by weight of finely divided particulates of at least one refractory filler, permitting said melt to solidify, and thereafter detaching said metal mold member from said mold pattern.

22. The process as defined by claim 21, said curable organopolysiloxane comprising an alpha,omega-dihydroxydiorganopolysiloxane and a cross-linking agent therefor.

23. An elastomeric mold pattern comprising a front faced surface defining a mold configuration to be reproduced by the spraying of molten metal, said front face surface having a Shore A hardness ranging from 61 to 79 and said front face surface having a peripherial region having a Shore A hardness of less than about 30, and said elastomeric silicone containing from about 39 to about 74% by weight of finely divided particulates of at least one refractory filler.

24. The mold pattern as defined by claim 23, the rear face surface thereof comprising reinforcing means.

25. The mold pattern as defined by claim 24, said reinforcing means being adopted for heat transfer.

* * * * *